W. C. MARGEDANT.
Planing-Machines.
No. 154,501. Patented Aug. 25, 1874.
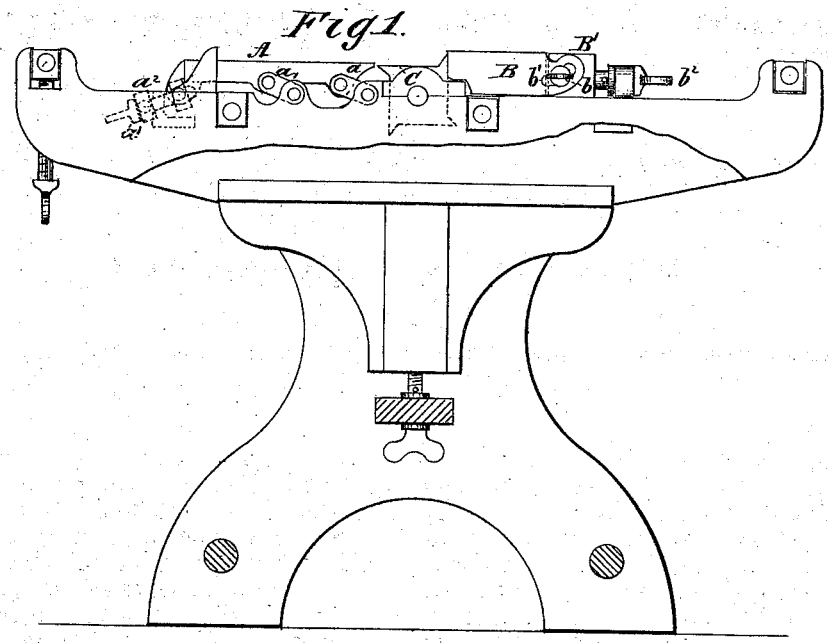
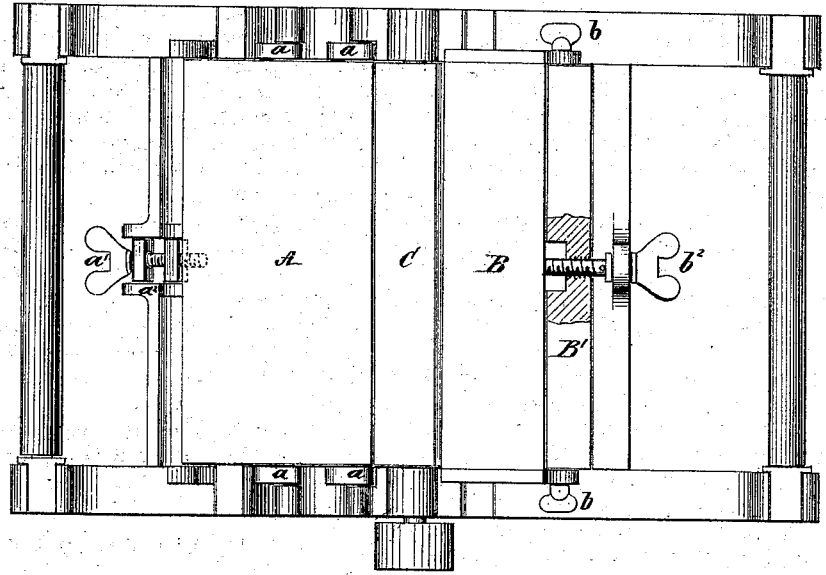
WITNESSES:
INVENTOR:
ATTORNEYS.

UNITED STATES PATENT OFFICE.

WILLIAM C. MARGEDANT, OF HAMILTON, OHIO, ASSIGNOR TO BENTEL, MARGEDANT & CO., OF SAME PLACE.

IMPROVEMENT IN PLANING-MACHINES.

Specification forming part of Letters Patent No. 154,501, dated August 25, 1874; application filed June 27, 1874.

*To all whom it may concern:*

Be it known that I, WILLIAM C. MARGEDANT, of Hamilton, in the county of Butler and State of Ohio, have invented a new and Improved Planing Machine for Surfacing; and I do hereby declare that the following is a full, clear, and exact description of the same, reference being had to the accompanying drawings, forming a part of this specification, in which—

Figure 1 represents a side elevation, and Fig. 2 a plan view.

The invention relates to such surface-planers as are described in patent No. 149,494, and consists in improving them by causing the apron, which prevents the collection of shavings on the rollers, and the bonnet, which catches the shavings and throws them on the apron, to serve also as an upper table, as hereinafter described.

A represents a plate, piece, or apron of a surface-planer, connected with the frame by pivoted links $a\ a\ a\ a$, and held at different points of adjustment by a swiveled screw, $a^1$, working in a swiveled nut, $a^2$. This gives a horizontal as well as a vertical adjustment, so as to retain the table at a proper distance from the rotary cutter, and to regulate the thickness of the cut or the position of apron. B is a plate, piece, or bonnet, which is attached to head B' by clamp-screws $b\ b$ that pass through arc-slots $b^1\ b^1$, while the head B' is itself adjustable by a set-screw, $b^2$. This allows the bonnet to be moved in the arc of a circle as well as back, to take a horizontal position corresponding to the previously-described one of apron A, one on each side of cutter C. They are thus made to form an upper table when it is desired to plane above the cutter, or both above and below. The piece A may thus be employed as an upper table in front of cutter, or, when not so used, brought down to serve as the apron generally required in the subjacent cutting operation, while the piece B may be made to answer at one time for a bonnet and at another for an upper table back of the cutter. I thus utilize the apron and bonnet, which heretofore served only one purpose, for another different and very useful one. In other words, with my improvement an operator is enabled to use a surface-planer as heretofore, with the lower table in connection with bonnet and apron, or to adjust apron and bonnet accurately and easily for use as an upper table.

Having thus described my invention, what I claim as new is—

1. The plate or piece B, adjustable in the arc of a circle as well as back and forward, to serve as a bonnet or upper table, in the manner described.

2. The combination, with a plate or piece, A, of the pivoted links $a$, swiveled screw $a^1$, and swiveled nut $a^2$, as and for the purpose set forth.

3. The bonnet B, provided with arc-slots $b^1\ b^1$, and attached to head B' by set-screws $b\ b$, in combination with the cutter-head, substantially as and for the purpose specified.

WILLIAM C. MARGEDANT.

Witnesses:
D. B. MILLIKIN,
JOHN E. HUGHES.